Jan. 25, 1938.   B. S. PURINTON   2,106,415
METHOD AND APPARATUS FOR THE MOLDING OF COVERED CERAMIC RECEPTACLES
Filed July 27, 1936
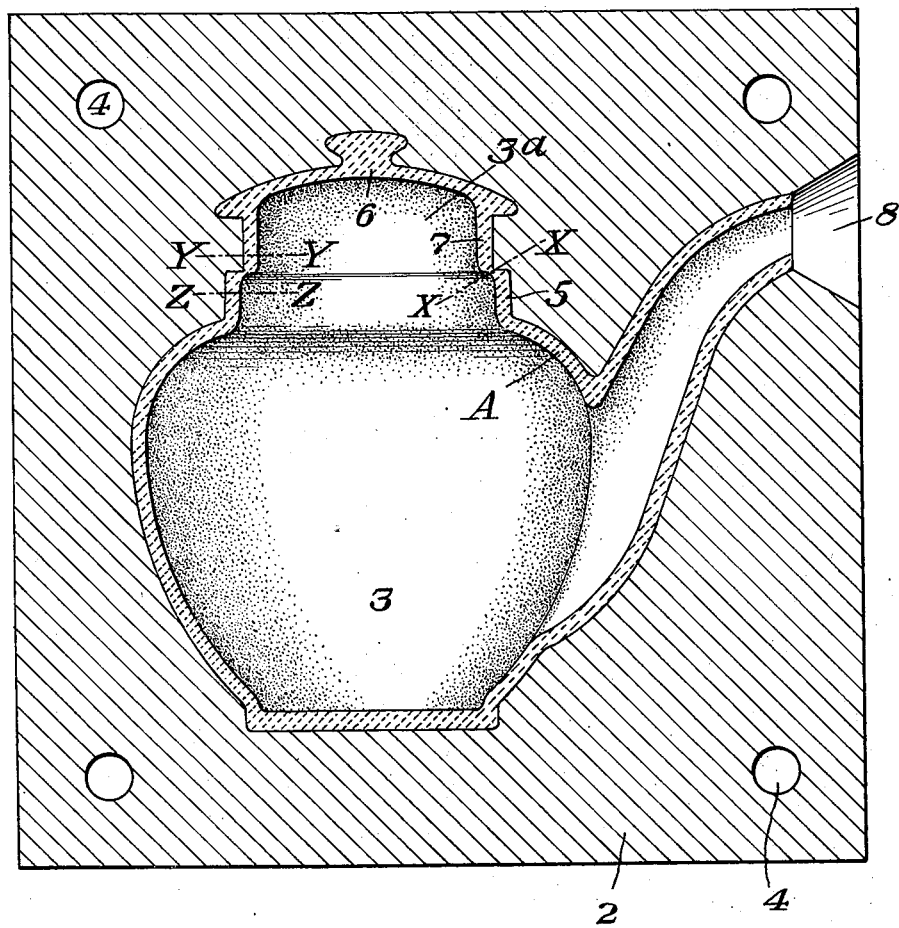
INVENTOR
Bernard S. Purinton
by his attorney
Stebbins, Blenko & Parmelee Patented Jan. 25, 1938

2,106,415

UNITED STATES PATENT OFFICE 2,106,415

METHOD AND APPARATUS FOR THE MOLDING OF COVERED CERAMIC RECEPTACLES

Bernard S. Purinton, East Liverpool, Ohio

Application July 27, 1936, Serial No. 92,751

7 Claims. (Cl. 25—129)

This invention relates to the manufacture of covered receptacles formed of ceramic material by the method of casting.

In the usual method of casting, a mold is prepared in a separable body of plaster of Paris. A slip comprised of water and clay is poured into the mold cavity. The walls of the mold cavity absorb water from the slip, causing the suspended clay particles to be deposited around the interior of the mold cavity. After the slip has remained in the mold for a predetermined length of time the excess slip is poured out and the mold is opened. The green clay article so formed is then removed from the mold and fired.

In the making of covered receptacles, it has heretofore been the practice to mold the receptacle and the cover in separately prepared molds with separate casting operations. The present invention provides a mold and a method of molding wherein the cover and the receptacle are cast as an integral unit and the cover is separated from the unit in the green state after the unit has been removed from the mold. After separation, the receptacle and the cover are fired separately.

The invention is applicable to the manufacture of any type of covered receptacle and particularly any such receptacle wherein the cover is provided with a flange which enters a neck in the receptacle. In the drawing in connection with which the invention is described, a teapot has been taken as an example of one type of covered receptacle to which the invention is applicable, but it will be understood that this is merely by way of illustration and that the invention is equally applicable to the manufacture of other receptacles, such as various covered tableware articles, industrial receptacles, such as porcelain crucibles having covers, and various other hollow articles having separable complementary parts.

In the accompanying drawing, the figure represents a transverse section through a mold embodying my invention, showing the manner of casting the receptacle and cover as a single unit, the receptacle being shown in section within the mold cavity.

In the drawing, 2 designates a mold block having a mold cavity 3 therein, the shape of the cavity conforming to the shape of the receptacle to be cast. Molds of this character are usually formed in sections as is well understood and generally practiced in the art at the present time. I have illustrated the mold 2 as having holes therein for dowel pins by means of which the sections are maintained in registration, these holes being designated 4. These holes form no part of the present invention.

Formed as a continuation of the mold cavity 3 is a cavity extension 3a shaped to conform to the shape of the cover. The receptacle, designated generally as A, is provided with a neck portion 5 over which the cover is adapted to sit and into which a flange on the cover telescopes. The cover, designated generally as B, has a main cover portion 6 and a flange 7. The portion 3a of the mold cavity is positioned in the mold block immediately adjacent the part of the main mold cavity which forms the neck so that the cover is formed in juxtaposition to the part of the finished article with which it is intended to cooperate. In using the mold, the mold cavity 3 and its extension 3a are filled with the ceramic slip, a filling opening for filling the mold cavity being indicated at 8. The casting is performed in the usual way, and when the mold is opened the cover is attached to the body of the receptacle, the whole being an integral unit. The green clay at this stage of the process is very soft and can be easily cut by a suitable implement.

In carrying out the present invention, the unit would be separated by cutting in the plane of the line X—X to separate the cover from the receptacle. After the cover and receptacle have been separated, the edges where the cut has been made can be properly trimmed and shaped. While the cutting preferably takes place on the line X—X, it will, of course, be apparent that the mold can be so designed that two cuts might be made as, for instance, one in the plane of the line Y—Y and the other in the plane of the line Z—Z, whereby the part of the receptacle intermediate the two cuts will be separated and, if of no utility, thrown away.

By forming the covers as a unit with the receptacles, it is not necessary to provide or to handle two sets of molds. The plaster of Paris molds can be made just as readily in this manner as where they are made separately. Moreover, it is just as easy for the potter to fill a mold of this character and to perform the operation of casting as where the two parts are made separately. The operation of cutting can be quickly and easily performed so that the cover and the receptacle can be fired separately. The invention conserves material in that a smaller amount of plaster of Paris is required than where the molds are separately made and less space is required in the casting room than where two sets of molds have to be handled. In addition to this, the casting of the covers is correlated to the casting of the bodies.

As previously stated, the particular receptacle shown in the drawing is merely illustrative of the application of my invention to casting hollow articles having complementary separable parts.

I claim:

1. The method of making hollow ceramic articles having complementary parts, which comprises casting the article with its complementary parts as an integral unit, and separating the unit into separable parts after it has been removed from the mold in which it is cast.

2. The method of casting receptacles having cooperating removable covers, which comprises casting the receptacle and cover as an integral unit in a mold, removing the unit so formed from the mold, cutting the cover and the receptacle apart in the green state and then firing the receptacle and the cover as separate parts.

3. The method of making receptacles having cooperating separable covers from ceramic material, which comprises casting the receptacle and cover as an integral unit in a mold, separating the cover from the receptacle after it has been cast, and thereafter firing the cover and receptacle as separate parts.

4. A mold for the molding of hollow ceramic receptacles having a cover which is removable, said mold having a single mold cavity therein shaped to form the receptacle and the cover as an integral unit.

5. A mold for use in the manufacture of hollow ceramic articles having removable covers comprising a porous body into which a slip may be cast, said body having a mold cavity therein shaped to form a receptacle with an opening to receive a cover, said cavity having an extension juxtaposed to the part of the receptacle where the cover is to be received and which is shaped to form the cover for the receptacle, said mold cavity and extension being adapted to form the receptacle and the cover as a single unit in such manner that the cover and the receptacle can thereafter be separated by cutting.

6. The method of making ceramic articles having complementary parts with interfitting extensions, which comprises casting the article with its complementary parts as an integral unit and with the interfitting extensions offset in end-to-end relation, and separating the unit into separable parts after it has been removed from the mold in which it is cast, the separation being effected to eliminate the connection between the parts in the zone of the offset.

7. The method of making ceramic articles having complementary separable parts by casting, which comprises casting the articles from a ceramic slip with the complementary parts being integral, subsequently severing the integral casting into its complementary parts, and separately firing such parts.

BERNARD S. PURINTON.